(12) United States Patent
Nakasuka

(10) Patent No.: US 7,156,349 B2
(45) Date of Patent: Jan. 2, 2007

(54) ARTIFICIAL SATELLITE

(75) Inventor: Shinichi Nakasuka, 4-7-3-205, Yoyogi, Shibuya-ku, Tokyo 151-0053 (JP)

(73) Assignees: Shinichi Nakasuka, Tokyo (JP); Sakura Technology Development Co., Ltd., Tokyo (JP)

( * ) Notice: Subject to any disclaimer, the term of this patent is extended or adjusted under 35 U.S.C. 154(b) by 0 days.

(21) Appl. No.: 11/110,872

(22) Filed: Apr. 21, 2005

(65) Prior Publication Data

US 2005/0230558 A1  Oct. 20, 2005

Related U.S. Application Data

(63) Continuation of application No. PCT/JP03/13576, filed on Oct. 23, 2003.

(30) Foreign Application Priority Data

Oct. 24, 2002  (JP) .............................. 2002-309645

(51) Int. Cl.
*B64G 1/10* (2006.01)
*B64G 1/44* (2006.01)

(52) U.S. Cl. ................. 244/172.7; 244/173.3

(58) Field of Classification Search ............ 244/159.4, 244/159.5, 172.7, 173.3
See application file for complete search history.

(56) References Cited

U.S. PATENT DOCUMENTS 3,346,419 A * 10/1967 Webb ..................... 136/244
4,394,529 A    7/1983 Gounder et al. ........... 136/245
6,016,999 A * 1/2000 Simpson et al. ......... 244/159.5
6,568,638 B1 * 5/2003 Capots .................... 244/159.4

FOREIGN PATENT DOCUMENTS

| EP | 0 849 167 A | 6/1998 |
|----|-------------|--------|
| JP | 61-50100 | 4/1986 |
| JP | 62-191300 | 8/1987 |
| JP | 9-30499 | 2/1997 |
| JP | 10-203494 | 8/1998 |
| JP | 10-210057 | 8/1998 |
| JP | 10-226399 | 8/1998 |
| JP | 2000-264299 | 9/2000 |
| JP | 2000-350345 | 12/2000 |

OTHER PUBLICATIONS

International Search Report for PCT/JP03/13576 dated Feb. 10, 2004.
Introduction ot Design of Satellites, Baifukan co., Ltd., Jun. 13, 2002, p. 82, Figure 3.6.
Handbook for Aeronautical and Space Engineering, Maruzen Co., Ltd., Sep. 30, 1992, p. 840, Table C1.14 and p. 814, Figure C1.22.
Hyman, "An Alternative to Deployed Thermal Radiators: Deployed Equipment Modules . . . ", AIAA/USU Conference on Small Satellites, Sep. 1997, pp. 1-12, XP008015994.

* cited by examiner

*Primary Examiner*—Robert P. Swiatek
(74) *Attorney, Agent, or Firm*—Nixon & Vanderhye P.C.

(57) ABSTRACT

A plurality of panels are coupled rotatably by a hinge mechanism. The panels are folded when a rocket loaded with the panels is launched and unfolded in space after the artificial satellite is released. Each of the panels is loaded with at least functional elements such as a solar panel, a battery, an attitude control device and a communication device separately or together. The devices loaded on the panels are electrically connected to each other.

7 Claims, 6 Drawing Sheets

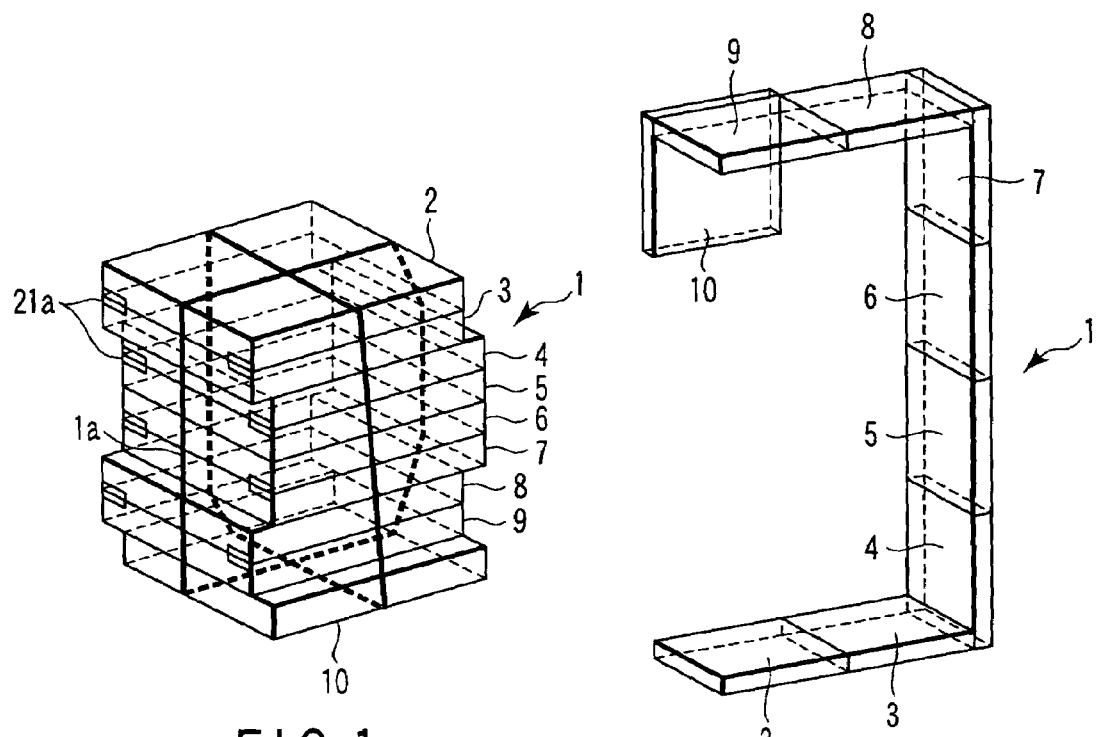
FIG. 1
FIG. 2
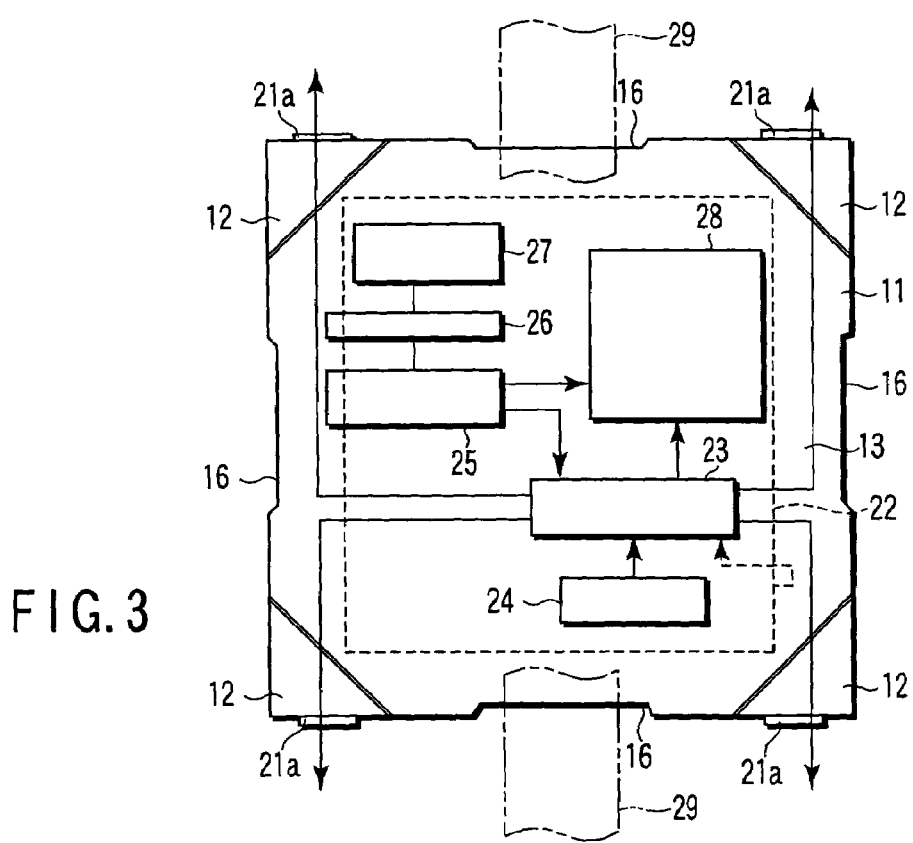
FIG. 3

ARTIFICIAL SATELLITE

CROSS REFERENCE TO RELATED APPLICATIONS

This application is a continuation of Application No. PCT/JP03/13576, filed 23 Oct. 2003, which claimed priority to Japanese Application No. 2002-309645, filed 24 Oct. 2002, which is pending. The entire contents of each of which are hereby incorporated by reference in this application.

BACKGROUND OF THE INVENTION

1. Field of the Invention

The present invention relates to an artificial satellite that is launched into space aboard a rocket to allow communications with the ground and observations of the earth.

2. Description of the Related Art

In the beginning of space development, artificial satellites were each a developed product. They were all designed and developed from the beginning and launched aboard a rocket. At that time, each individual component and part was improved gradually in view of the results of the launch, and the artificial satellites themselves or their partial constituting elements could not be standardized unlike general industry products. In other words, the artificial satellites were manufactured one by one, which increased their costs and lengthened their development period.

In the latter half of the 1970s, a communications satellite was coming to the fore as the principal mission of an artificial satellite. In the age when demand for communications increased and private companies owned artificial satellites, a number of communications satellites were launched.

The communications satellites had a system unit called a bus unit almost in common as one of requests to the artificial satellites. The bus unit could be designed as a common one, and only the function units (mission equipment units) could be designed and developed individually at user's different requests.

Since the bus units of the satellites were almost standardized, the development and manufacturing costs of the artificial satellites could be decreased and the development period thereof could greatly be shortened. The makers and users of the artificial satellites could therefore obtain a lot of benefit. For example, Hughes Aircraft Company that adopted this system achieved huge success and the basic idea of the system continues until today.

As an example of a prior art artificial satellite designed and manufactured individually, an engineering test satellite No. 6 (made in Japan) is known, as disclosed in Masamichi Shigehara and Yoshio Toriyama, "Introduction to Design of Satellites," Baifukan Co., Ltd., Jun. 13, 2002, p. 82, FIG. 3.6. This is an artificial satellite that is a box-shaped structure including a mission panel and an access panel, which are honeycomb sandwich panels. The structure includes a solar panel, an antenna module and a communication device.

As a module-type artificial satellite, a satellite whose common unit called a bus unit is standardized and whose mission (targeted function unit) is manufactured to order is known, as disclosed in The Japan Society for Aeronautical and Space Sciences, "Handbook for Aeronautical and Space Engineering," Maruzen Co., Ltd., Sep. 30, 1992, p. 840, Table C1.14 and P. 841, FIG. C1.22.

A module-coupled type space structure and an attitude control method are known as disclosed in Jpn. Pat. Appln. KOKAI Publication No. 2000-264299. A module-system spacecraft developing method is known as disclosed in Jpn. Pat. Appln. KOKAI Publication No. 10-226399. A module-system spacecraft backbone interface is known as disclosed in Jpn. Pat. Appln. KOKAI Publication No. 10-210057. A module-system spacecraft structure is known as disclosed in Jpn. Pat. Appln. KOKAI Publication No. 10-203494.

A huge success was achieved by standardizing the bus units of artificial satellites chiefly including communications satellites using the method described above. Paying attention to generally used artificial satellites including earth observatory satellites, however, the artificial satellites are difficult to standardize in view of a large variety of requests for functions and performance of the artificial satellites, and are manufactured one by one. High costs and long periods for developing the artificial satellites still remain unchanged.

The reason for the above is as follows. It is a relay that is mainly loaded on a communications satellite, and there is no big difference in request for functions between communications satellites. In contrast, a generally used artificial satellite may include a radar and TV broadcasting equipment using power that is higher than that of the satellite. Some artificial satellites loaded with a special observation machine are particularly strict with an attitude control system. In order to develop a satellite having various function requests, a standardized bus developed chiefly for communications satellites is difficult to use, and any cost advantage cannot be obtained.

The artificial satellites disclosed in the above publications "Introduction to Design of Satellites" and "Handbook for Aeronautical and Space Engineering" are complicated in structure and large in size and cannot be folded compact. They cannot be therefore loaded into a small-sized rocket.

These publications 1 to 4 disclose a module-system structure and a module-coupled structure and none of them disclose any technical concept of combining a plurality of modules (panels) having different functional elements.

The present invention provides an artificial satellite which can be folded compact when it is launched aboard a rocket and whose functions, performance and capacities can be extended and reduced at user's requests to thereby decrease its costs and shorten its development period.

BRIEF SUMMARY OF THE INVENTION

According to the present invention, a plurality of panels are coupled rotatably by a hinge mechanism. The panels are folded when the panels are launched aboard a rocket and unfolded in space after the panels are released. Each of the panels is loaded with at least a battery and a inter-panel communication device separately or together. Power and information is transferred between communication devices of the panels.

According to the above configuration, since the panels are coupled by the hinge mechanism, they can be folded compact and loaded into a narrow space in the rocket. The panels are also loaded with devices at user's request, and a necessary one of the panels is used. The panels therefore increase and decrease in number to be flexibly adapted to the requests for functions and reliability.

Since a solar panel is mounted on the outer surface of each of the panels, the area that receives sunlight can be enlarged to improve the power generated therefrom. Since, moreover, the panels are coupled by a thermal conductivity sheet having flexibility, a difference in temperature between the panels can be brought as close as possible to zero.

BRIEF DESCRIPTION OF THE SEVERAL VIEWS OF THE DRAWING

FIG. 1 is a perspective view of an artificial satellite according to a first embodiment of the present invention, which is folded;

FIG. 2 is a perspective view of the artificial satellite according to the first embodiment, which is unfolded;

FIG. 3 is a schematic plan view of a panel according to the first embodiment;

DETAILED DESCRIPTION OF THE INVENTION

Figure 4:
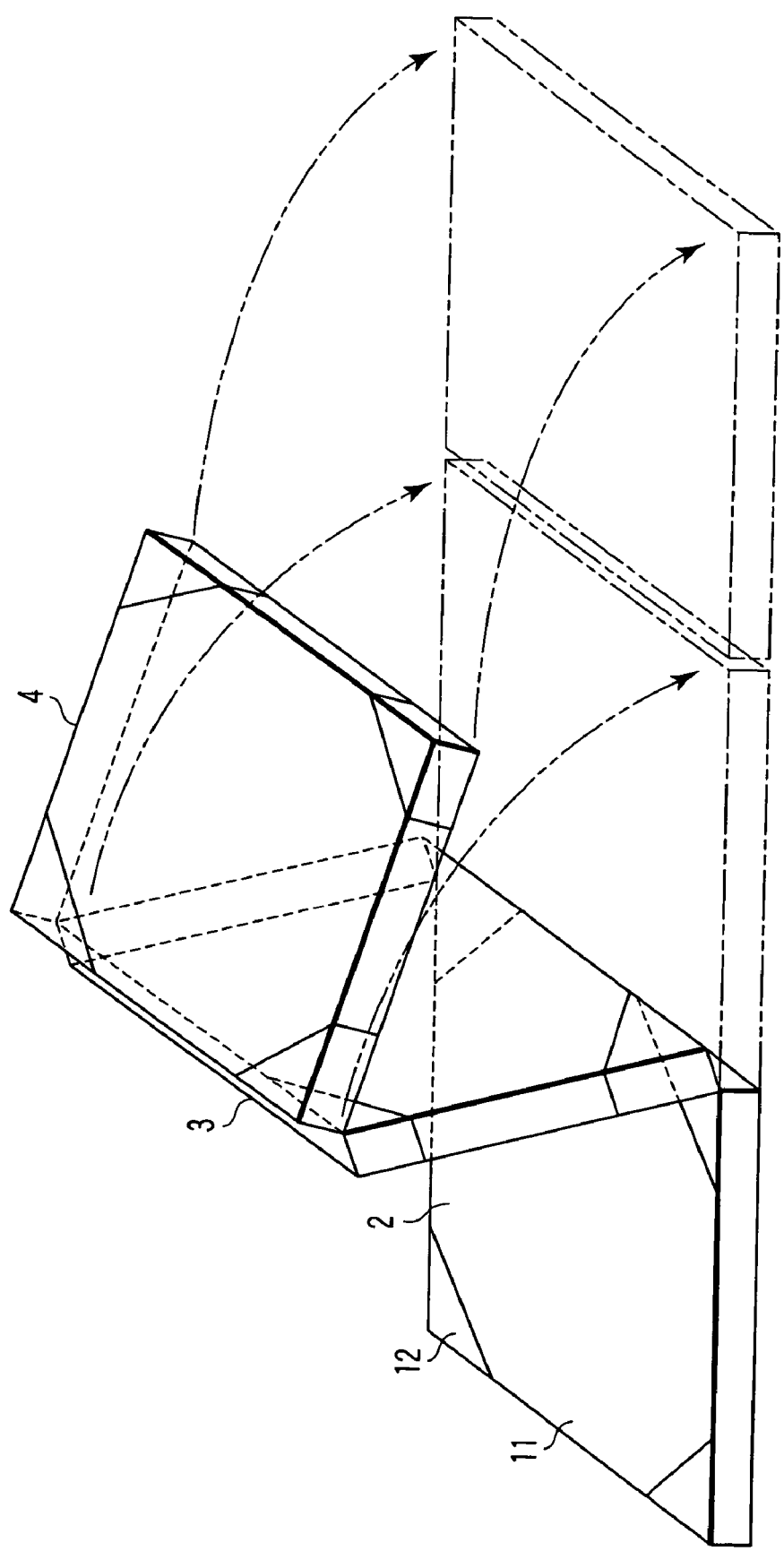
FIG. 4 is a perspective view showing a panel according to the first embodiment, which is folded.
Figure 5:
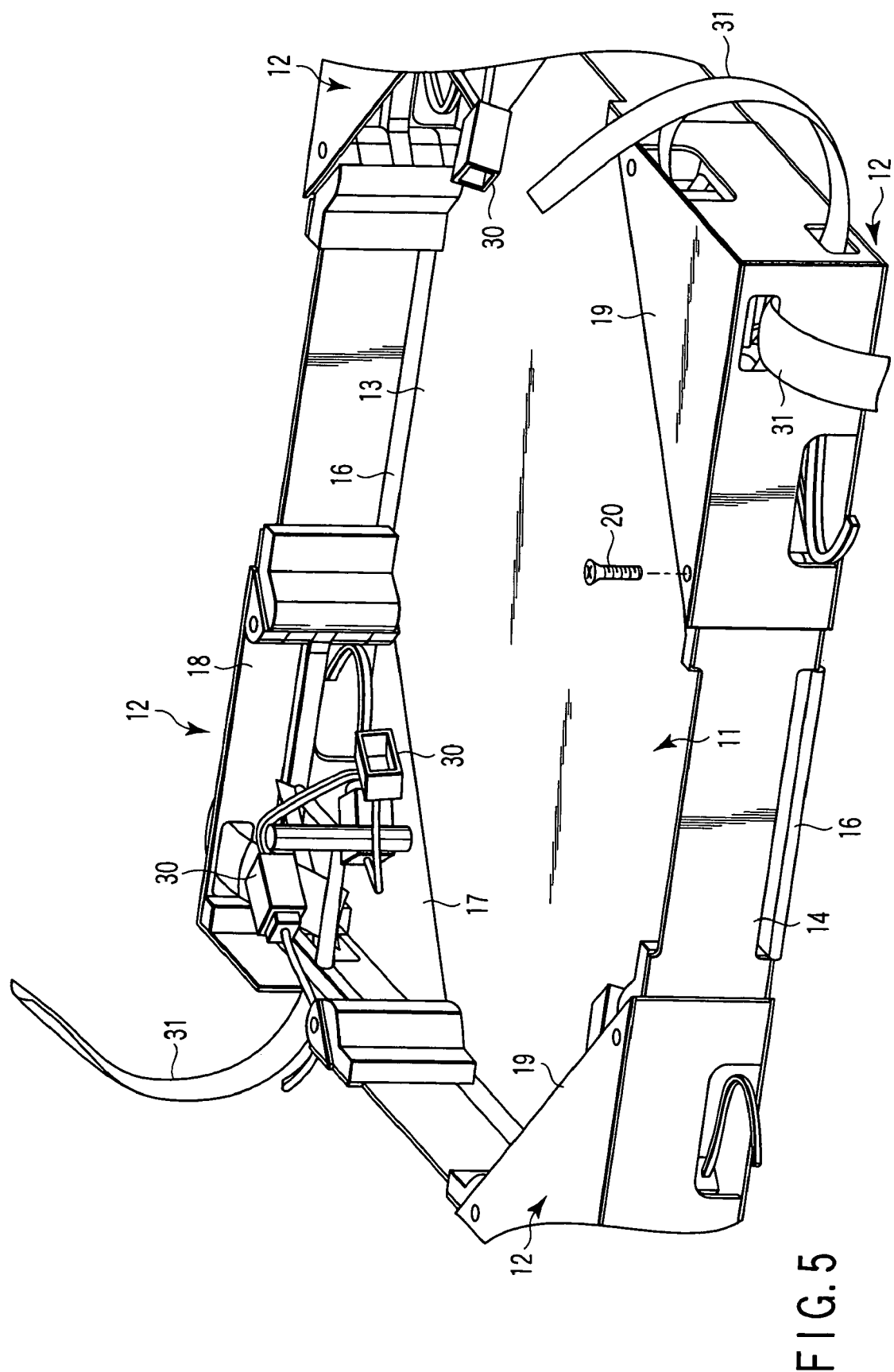
FIG. 5 is a perspective view showing the internal structure of the panel according to the first embodiment.
Figure 6:
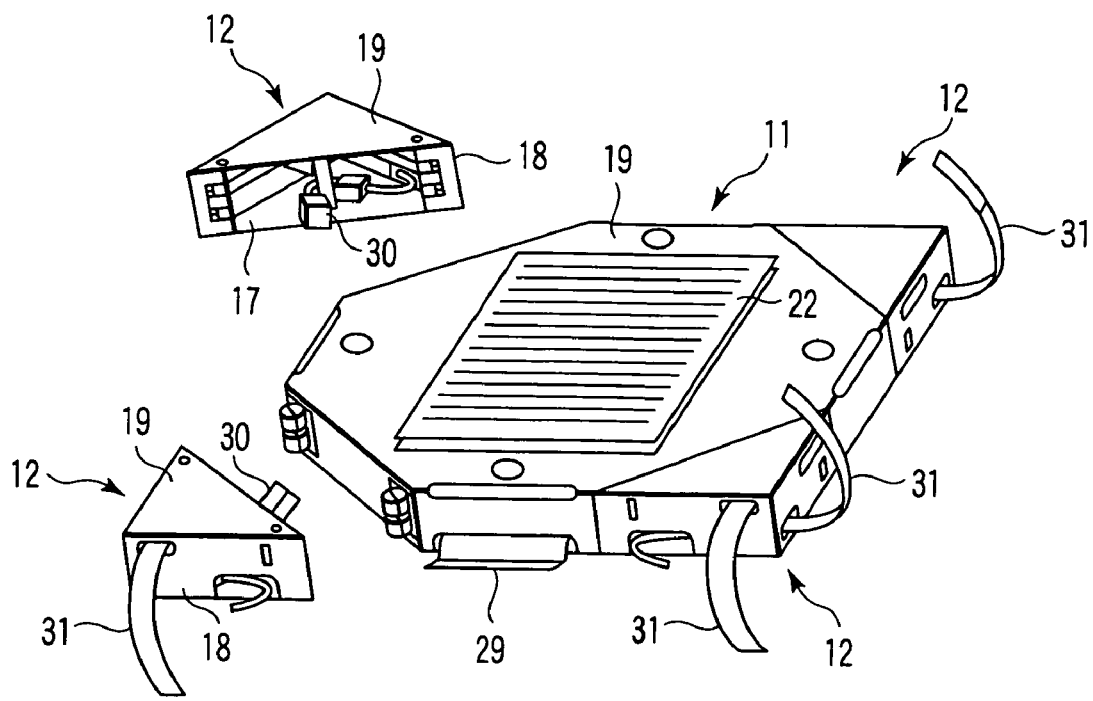
FIG. 6 is an exploded perspective view of the panel according to the first embodiment.
Figure 7:
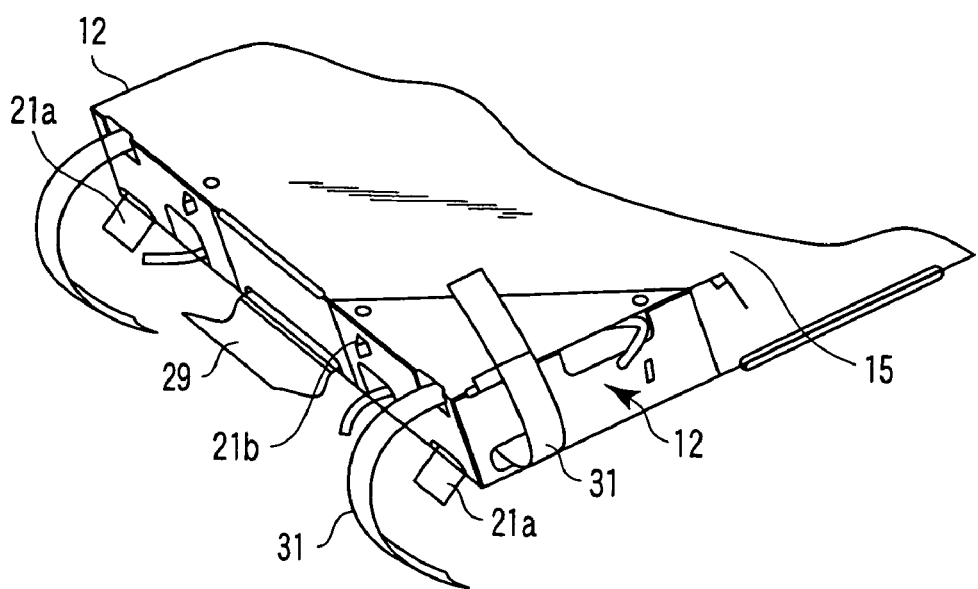
FIG. 7 is a perspective view of a corner panel according to the first embodiment.
Figure 8:
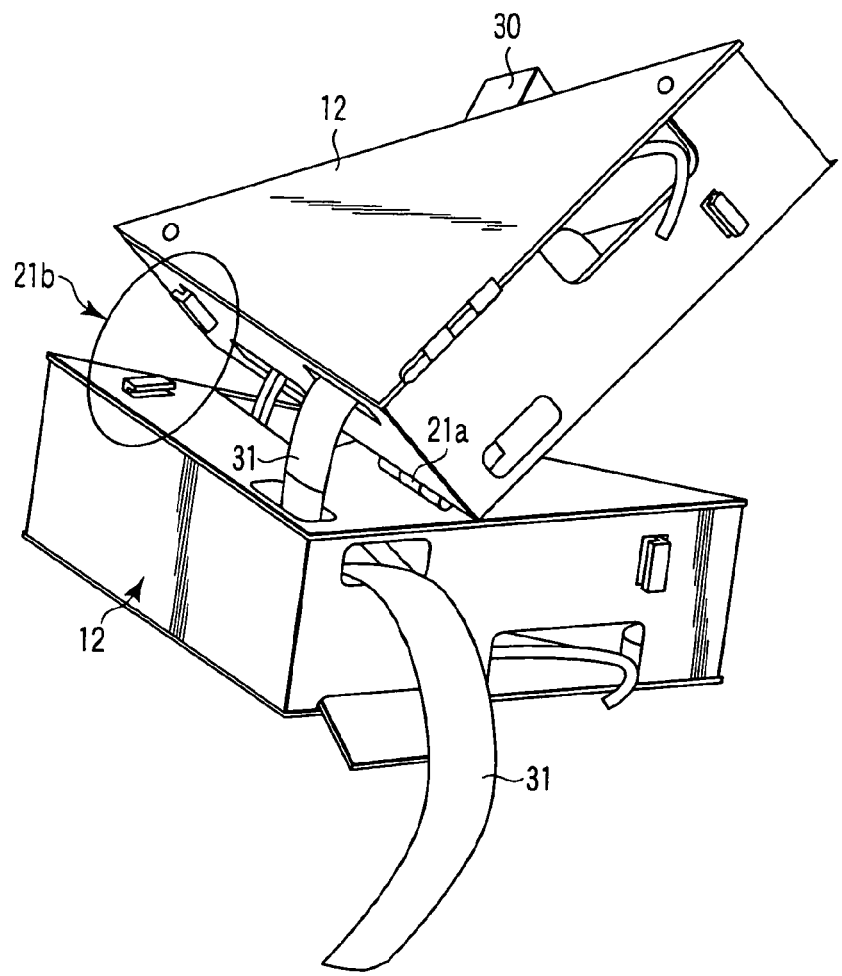
FIG. 8 is a perspective view of the corner panel according to the first embodiment.
Figure 9:
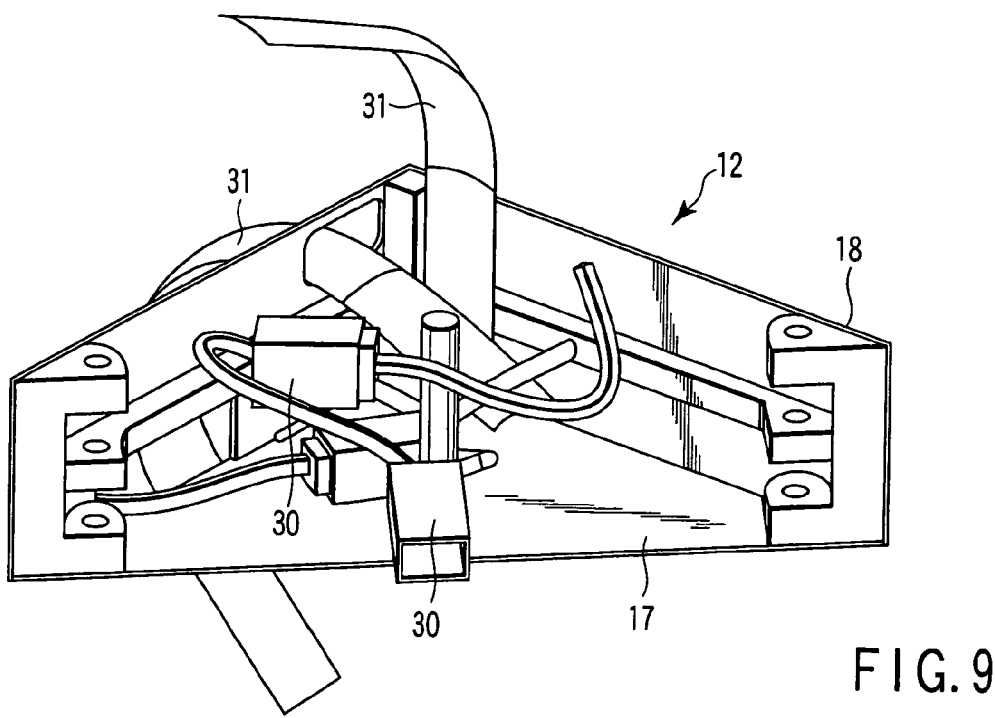
FIG. 9 is a perspective view showing the internal structure of the corner panel according to the first embodiment.

Embodiments of the present invention will be described below with reference to the drawings of an artificial satellite for optical observation using a lens as an example.

FIGS. 1 to 9 show an artificial satellite according to a first embodiment. FIG. 1 is a perspective view of the artificial satellite that is folded, and FIG. 2 is a perspective view of the artificial satellite that is unfolded. In the first embodiment, nine panels of substantially the same size are coupled by a hinge mechanism, which will be described later, in such a manner that they can be folded to thereby constitute an artificial satellite 1. Describing the unfolded artificial satellite 1 shown in FIG. 2 in brief, a mission equipment panel 3 is coupled to one end of a communication panel 2 such that they are flush with each other. A first CPU panel 4 is coupled to the other end of the mission equipment panel 3 at right angles. In the artificial satellite 1, the mission equipment panel 3 is loaded with a device for optical observation, e.g., an optical device such as a lens having a long focal length.

A power supply panel 5, a first attitude control panel 6 and a second CPU panel 7 are coupled in this order to the other end of the first CPU panel 4 such that they are flush with each other. An image sensor memory panel 8 is coupled to the other end of the second CPU panel 7 at right angles.

A second attitude control panel 9 is coupled to the other end of the image sensor memory panel 8 such that they are flush with each other. The image sensor memory panel 8 and second attitude control panel 9 are parallel with the communication panel 2 and mission equipment panel 3. A third attitude control panel 10 is coupled to one side of the second attitude control panel 9 at right angles. The first, second and third attitude control panels 6, 9 and 10 are arranged in three directions that are perpendicular to each other and can generate three shifting attitude control forces. The artificial satellite 1 is shaped almost like a Japanese letter "コ" when it is unfolded. The panels 2 to 10 are folded in zigzags and bound with a binding rope 1a to allow the layered panels to be loaded on a rocket as shown in FIG. 1. The reason why the artificial satellite 1 is shaped almost like a Japanese letter "コ" is that the image sensor memory panel 8 picks up an image from the light that passed through a lens of the mission equipment panel 3 and observes the image optically.

The panels 2 to 10 are basically of the same shape and size. Describing the first attitude control panel 6 as an example, it is configured as shown in FIGS. 3 to 9. A panel main body 11, which is formed of light-metal materials or light and high-strength composite materials such as CFRP, is shaped like an octagon that is obtained by cutting four corners of a square in plan into triangular corner panels 12. These triangular corner panels 12 are coupled to the four corners of the panel main body 11.

The panel main body 11 is shaped like a flat box that is configured by a bottom plate 13, a side plate 14 corresponding to the sidewall, and a cover plate 15. Notches 16 are formed on their respective four sides of the side plate 14. Each of the corner panels 12 is also shaped like a flat box that is configured by a bottom plate 17, a side plate 18 corresponding to the sidewall, and a cover plate 19. The bottom plate 17 and cover plate 19 of each of the corner panels 12 are fixed to the bottom plate 13 and cover plate 15 of the panel main body 11 by bolts 20, respectively, with the result that the corner panels 12 are coupled to the panel main body 11.

A hinge mechanism 21a is attached to the corner between the bottom plate 17 and side plate 18 of each of the corner panels 12 to couple adjacent panels rotatably to each other. The hinge mechanism 21a is energized by an energizing spring or the like in which direction the panels are coupled to each other. The present invention is not limited to the hinge mechanism 21a. Any mechanism can be used if it allows adjacent panels to be rotatably coupled to each other. Further, a latch mechanism 21b is provided on the side plate 18 opposed to the hinge mechanism 21a. When the panels are unfolded, the unfolding conditions are held by the latch mechanism 21b.

A solar panel 22 is stuck to the outer surface of the panel main body 11 to which sunlight is applied, such as the outer surfaces of the bottom plate 13 and cover plate 15. The solar panel 22 is electrically connected to a battery 23 located in the panel main body 11. The battery 23 includes a battery control unit 24.

The panel main body 11 includes a controller 25, a LAN card 26, a wireless LAN antenna 27 and a functional element 28. The functional element 28 is electrically connected to the battery 23 and also connected to the controller 25 through a signal line. In the case of the first attitude control panel 6, the functional element 28 is an attitude control device and an attitude change device (e.g., a device for storing and emitting angular momentum such as reaction wheel). In the case of the communication panel 2, the functional element 28 is a device for communicating with the ground. The panels 2 to 10 differ only in the functional element 28 and the other elements are the same.

Adjacent panels each corresponding to the panel main body 11 are connected to each other by a tape-shaped thermal conductivity sheet 29 having flexibility, which is drawn out of the notches 16 through the panels. The thermal conductivity sheet 29 is adhered to part of the panel main body 11 or the device thereof by an adhesive (not shown). The thermal conductivity sheet 29 is a high thermal conductivity sheet and serves to bring a difference in temperature among the panels as close as possible to zero. In other words, the panels are varied in temperature due to how sunlight is applied, heat radiation from the control device in the panel main body 11, and the like. If, however, the panels are connected to each other by the thermal conductivity sheet 29, heat is quickly transferred from a higher-temperature panel to a lower-temperature panel to keep the temperature difference among all the panels almost constant.

When the artificial satellite 1 generates and receives heat to excess and its entire temperature increases too much, the panel main body 11 can be provided with a radiator. The radiator can dissipate heat into space and the thermal conductivity sheet 29 can radiate heat.

When the artificial satellite 1 generates a little heat and its entire temperature decreases too much, a heater can be used as the prior artificial satellite to transfer its heat to the thermal conductivity sheet 29. Since the panels are coupled to each other by the thermal conductivity sheet 29, no heater is provided for each of the panels. The number of heaters can be reduced and so can be the number of controllers.

The corner panels 12 include a power supply connector 30 and a flexible cord 31. The panels are electrically connected to each other through the power supply connector 30 and flexible cord 31 of the corner panels 12. The power generated from solar cells of each panel is used in the device in the panel and for charging the battery in the panel. Excess power is supplied to another panel that is short of power by the electrical connection.

A thermal conductivity confirmation test conducted on the thermal conductivity sheet 29 and the adhesive by the inventor(s) of the present invention will now be described. The name of the thermal conductivity sheet 29 is PGS Graphite Sheet (made by Panasonic), the thermal conductivity thereof is 800 W/mK, and the thickness thereof is 0.15 mm. The name of the adhesive is 6030HK (made by Techno Alpha Co., Ltd.) and the thermal conductivity thereof is 60 W/mK.

It is when three panels are connected to each other at right angles, sunlight is applied to the surface of one of the panels at right angles, and no sunlight is applied to the other panel that the thermal conductivity sheet has to transfer the largest amount of heat in order to minimize a difference in temperature among the panels (worst conditions).

In the configuration described above, the amount of heat Q that has to be transferred by the thermal conductivity sheet can be estimated as follows at worst:

$$Q = W_s S \quad \text{equation (1)}$$
$$= 1358 \times 0.3 \times 0.3$$
$$= 120 \ [W]$$

where Ws is the solar constant and S is the area of the panels.

The transfer of heat among the panels is performed by the flow of heat through the thermal conductivity sheet and that of heat through the adhesive. Evaluating a difference in temperature required to transfer the heat of 120W given by the above equation (1) in each of the flows of heat, the results as shown in the following Tables 1 and 2 are obtained.

TABLE 1

| Thermal Conductivity | 800 W/mk |
| Thickness of Sheet | 0.4 mm |
| Width of Connected Panels | 80 mm |

TABLE 1-continued

| Distance between Connected Panels | 1 mm |
| Difference in Temperature | 4.7 K |
| Amount of Heat to be Transferred | 120 W |

TABLE 2

| Thermal Conductivity | 60 W/mk |
| Area of Adhesion | 25 cm$^2$ |
| Thickness of Adhesion | 0.2 mm |
| Difference in Temperature | 0.16 K |
| Amount of Heat to be Transferred | 120 W |

Assume that heat flows through adjacent panels in the following order: a panel main body, an adhesive, a thermal conductivity sheet, an adhesive and a panel main body. The difference in temperature between the panels becomes about 5° C. and the uniformity of temperature can be achieved, as is apparent from Tables 1 and 2.

Figure 10A:
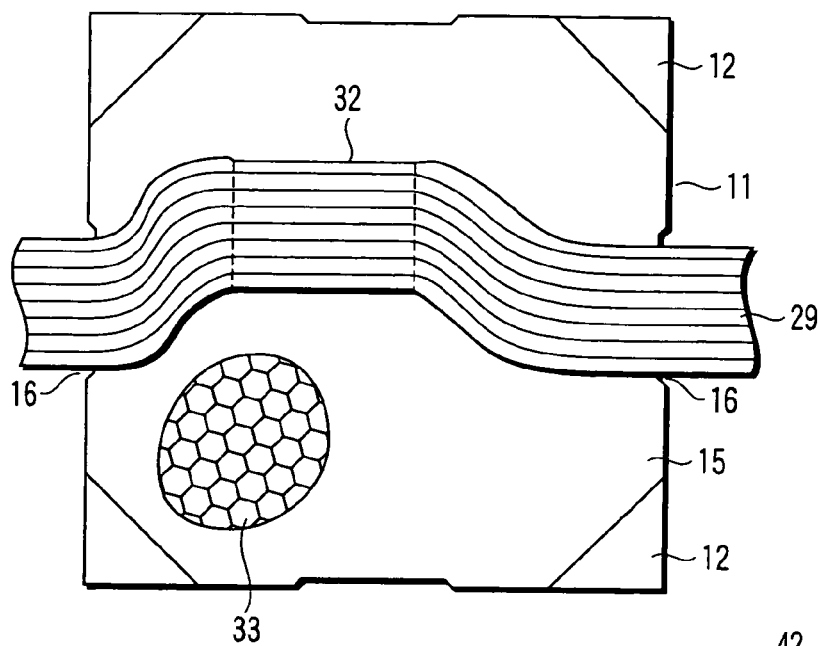
FIG. 10A is a schematic plan view showing a second embodiment of the present invention.
Figure 10B:
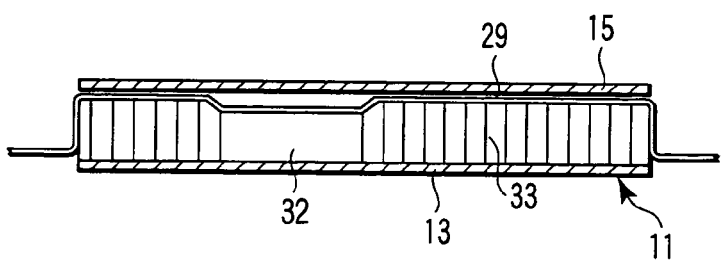
FIG. 10B is a longitudinal-sectional side view of the second embodiment.

FIGS. 10A and 10B show a second embodiment regarding a method of applying a thermal conductivity sheet. The same components as those of the first embodiment are denoted by the same numerals and their descriptions are omitted. In the second embodiment, the panel main body 11 includes a loaded device 32 and an aluminum honeycomb panel 33 in space other than that for the loaded device 32. The thermal conductivity sheet 29 is bonded to the top surface of the loaded device 32.

The aluminum honeycomb panel 33 can prevent the temperature of the panel main body 11 from becoming nonuniform in the thickness direction of the panel main body 11. While the thermal conductivity sheet 29 is bonded to the top surface of the loaded device 32, heat is transmitted through the panel main body 11 using the thermal conductivity sheet 29. The heat generated from the loaded device 32 can be transferred to adjacent panels by the thermal conductivity sheet 29, and a difference in temperature can be reduced.

Figure 11:
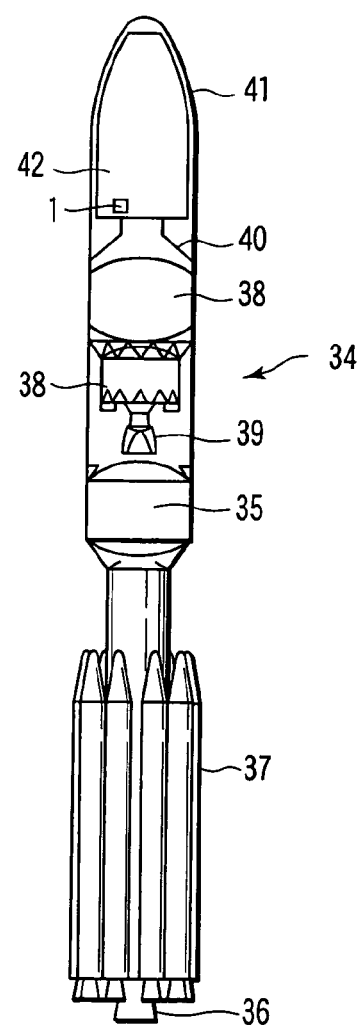
FIG. 11 is a sketch of an artificial satellite loaded in a rocket.

The artificial satellite 1 according to the first and second embodiments is loaded on a rocket 34 as shown in FIG. 11 while it is folded compact as shown in FIG. 1. The rocket 34 shown in FIG. 11 includes a rocket main body 35 under which a main engine 36 and a thrust augmentation fixed fuel rocket motor 37 are provided. Different fuel tanks 38 and a second-stage engine 39 are provided halfway in the rocket main body 35. A loaded-object connecting structure 40 is provided above the rocket main body 35 to be surrounded by a nose fairing 41. The artificial satellite 1 is loaded into the upper space 42 of the loaded-object connecting structure 40. When the rocket is adequately large as shown in FIG. 11, it can load a very large artificial satellite and additionally a second or third artificial satellite beside the loaded-object connecting structure 40. When the nose fairing 41 is divided and the rocket engine is completely burnt, the artificial satellite 1 is released into the space and unfolded as shown in FIG. 2.

In the foregoing embodiments, a plurality of rectangular panels are coupled rotatably by the hinge mechanism and can be folded when they are launched aboard a rocket and unfolded in space after they are launched. The shape of the panels and the number of panels are taken as one example, and the present invention is not limited to these shape and number. The unfolded states vary with the increase and decrease of panels in number and how the panels are connected. A panel with a function or a device loaded on the panel can appropriately be varied with user's requests. The present invention is not limited to the panels or devices of the above embodiments.

The following advantages can be obtained from the present embodiments.

(a) Low Costs and Improvement in Reliability

Since panels having basic functions are mass-produced, they can be decreased in costs and improved in reliability on a per-panel basis.

(b) Simplification of Development

The panels differ in function but have their mechanical, electrical and data interfaces in common. It is thus possible to enhance commonality of inspecting devices and inspecting procedures in the inspection or the ground test during the manufacture. In particular, the commonality of inspecting devices contributes to a reduction in costs and development period.

(c) Promotion of Movement of Small-Scale Companies into Developments

The commonality of interfaces can apply to the inside of the panels. Since the interface that the mounted equipment (functional element 28) contacts in the artificial satellite is standardized in this invention, the conditions for developing the functional element 28 are unified in advance. The design target is therefore easy to set. In the development of prior artificial satellites, a large variety of functional elements 28 constitute interfaces therebetween and thus all the elements are often developed at the same time. It is thus only general big companies that can work on the development of the functional elements 28.

If, however, internal interfaces are determined to some extent, companies that specialize in each individual technology can easily develop the functional elements 28.

(d) Increase in Degree of Freedom of Shape

In prior small-sized artificial satellites, an unfolding structure was difficult to load, and an artificial satellite that requires a long focal length as disclosed in the present embodiments was difficult to manufacture. Since, however, the shape of the main body of the artificial satellite can be varied by unfolding the panels, a mission that is subjected to geometric constraints can be achieved in the small-sized satellites.

As described above, the artificial satellite according to the present invention can be folded compact when it is launched aboard a rocket and its functions can be extended and reduced, thereby reducing in costs and development period.

An artificial satellite can be launched into space aboard a rocket to allow communications with the ground and observation of the earth or other functions, and its functions can be extended and reduction.

What is claimed is:

1. An artificial satellite that is launched into space aboard a rocket, the artificial satellite including a plurality of panels coupled rotatably by a hinge mechanism, the panels being folded when the artificial satellite is launched aboard the rocket and unfolded in space after the artificial satellite is released, each of the panels being loaded with at least a battery and an inter-panel communication device, and power and information being transferred between communication devices of the panels, adjacent ones of the panels being coupled to each other by a thermal conductivity sheet having flexibility.

2. The artificial satellite according to claim 1, wherein said plurality of panels include a communication panel, a CPU panel, a power panel, an attitude control panel, a heat control panel and a mission equipment panel, which are loaded with the device.

3. The artificial satellite according to claim 1, wherein each of the panels has a flat box structure that stores at least one functional element of the battery, an attitude control device, and a calculation device, and the communication device and has a solar panel on an outer surface thereof.

4. The artificial satellite according to claim 1, wherein the thermal conductivity sheet having flexibility is brought into contact with at least one functional element loaded on the panels.

5. The artificial satellite according to claim 1, wherein the panels each have an aluminum honeycomb structure in a space in each panel other than where the loaded devices are placed.

6. An artificial satellite that is launched into space aboard a rocket, the artificial satellite including a plurality of panels coupled rotatably by a hinge mechanism, the panels being folded when the artificial satellite is launched aboard the rocket and unfolded in space after the artificial satellite is released, each of the panels being loaded with at least a battery and an inter-panel communication device, and power and information being transferred between communication devices of the panels, each of said panels including a rectangular panel main body and corner panels provided at corner sections of the panel main body, and each of said corner panels having a hinge mechanism by which the panels are coupled to each other.

7. The artificial satellite according to claim 6, wherein each of said corner panels has a connector for a power supply line and a signal line through which the panels are electrically connected to each other.

* * * * *